United States Patent [19]

Boyle

[11] Patent Number: 4,839,186
[45] Date of Patent: Jun. 13, 1989

[54] APPARATUS FOR AND METHOD OF COOKING PIECES OF FOOD

[76] Inventor: Peter J. Boyle, 8033 Sunset Blvd., Suite 32, Los Angeles, Calif. 90046

[21] Appl. No.: 137,150

[22] Filed: Dec. 23, 1987

[51] Int. Cl.$^4$ .......................... A23C 3/00; A47J 37/04
[52] U.S. Cl. .................... 426/523; 99/421 H; 17/1 S
[58] Field of Search ........... 17/1 S; 99/421 A, 421 H; 426/523

[56] References Cited

U.S. PATENT DOCUMENTS

| | | | |
|---|---|---|---|
| 1,568,535 | 1/1926 | Schey | 99/421 H |
| 2,085,169 | 6/1937 | Prood | 99/421 H |
| 2,349,617 | 5/1944 | Gorman | 99/421 H |
| 3,483,816 | 12/1969 | Lombardi | 99/421 R |
| 3,527,155 | 9/1970 | Renn | 99/421 H |
| 4,078,478 | 3/1978 | Geisel | 99/421 H X |
| 4,483,241 | 11/1984 | Vaughn | 99/421 H |

*Primary Examiner*—Willie G. Abercrombie
*Attorney, Agent, or Firm*—Marks Murase & White

[57] ABSTRACT

A method and apparatus for cooking pieces of food. A two-pronged skewer supported on a raiser spaced from and in superposition with a cooking surface serves as a rack for a multitude of pins, each pin bearing pieces of food and held on the skewer by retainers. The arrangement facilitates large-scale grilling of food with minimum effort.

12 Claims, 3 Drawing Sheets

APPARATUS FOR AND METHOD OF COOKING PIECES OF FOOD

BACKGROUND OF THE INVENTION

1. Field of the Invention

The present invention relates to an apparatus for and a method of cooking and serving pieces of food and, more particularly, an apparatus and method especially well adapted to cooking and serving pieces of food on or from indoor and outdoor grills or barbecues as well as directly over cooking coals or a cooking fire.

2. Description of the Prior Art

The cooking of food transcends the mere exposure of the food to heat in order to induce chemical changes. Cooking is partly science, but it is more art. In fact, it is so much art that considerations of, for example, preparation and presentation are an important utilitarian rather than purely aesthetic aspect of the process.

The blend of the aesthetic and the utilitarian is well exemplified in skewer cooking and specifically in shish kebab. Shish kebab typically consists of cubes of meat such as lamb or beef marinated and cooked with vegetables such as onions, tomatoes, and green peppers on a skewer. At least part of the popularity of this food is due to how readily it lends itself to preparation on an outdoor grill or barbecue. The pieces of food, or kebab, are arranged on the skewer as desired by piercing the food with the pointed end of the skewer and sliding the food toward the other end. The skewer is then placed directly on the barbecue and manipulated with tongs by the cook. If the skewer is metal, cooking is even because the skewer cooks the food from the inside while exposure to the flames cooks the outside. When a desired degree of doneness is achieved, the skewer is removed from the grill and set upon a platter. The diner then removes the kebab from the skewer to a plate, typically by grabbing the blunt end of the skewer and sliding the kebab off the skewer using a fork. The kebab is then transferred to a plate.

This method of cooking and preparing food is generally satisfactory, and has surely led to many thousands of hours of recreational dining. It just as surely must be appreciated, however, that this method of cooking and preparing food has certain inherent limitations and hazards. One limitation is that the food on the skewer is placed directly on the grill during cooking, thereby exposing the food morsels to whatever contamination may exist on the grill surface. Another limitation is that the same skewer is used for supporting the raw food on the grill and for presentation of the food after cooking. This means that the skewer must be long enough to permit ready manipulation by the cook while the food is on the grill and thick enough to remain rigid over that length.

Because conventional skewers are relatively large, they tend to retain heat, making the skewers unsuitable as utensils for the actual eating of the food. Also, many cooks have the experience of certain types of food, such as fish, dropping off the skewer because the skewer is so large as to break the piece of food or, because of shrinkage during cooking, or the fragility of the food itself, the food becomes loose on the skewer and so tends to slide off the pointed end. Indeed, shrinking and softening of food during cooking complicates turning the food because it slips when the skewer is turned. Further, since the skewer is so long, it is often inconvenient to eat the food without first removing all of the cooked food morsels. It is also inconvenient to serve if one desires to eat a portion less than that contained on a full skewer.

SUMMARY OF THE INVENTION

In the present invention there is realized a preservation of all the benefits of the style of cooking discussed above, with elimination of many of the drawbacks and disadvantages. In an apparatus according to the present invention, there is a skewer having at least two skewer members joined at one end, each of the skewer members having a substantially straight section terminating in a free end, a plurality of pins supported by the straight sections of the skewer members, for suspending pieces of food between the skewer members, a pin retainer assembly cooperating with the skewer members to define a working area within which the pins are supported, and spaced raisers on which the skewer is mounted. In an arrangement according to the present invention, the members actually supporting the food, that is, the pins, can be small thereby enabling cooking and presentation of relatively small portions of a variety of foods. The pins are thus less likely to break the pieces of food, and can be inserted into a greater variety and into smaller pieces of food, such as fish, cherry tomatoes, mushrooms, and the like. Moreover, the pins also may serve as implements for actually eating the food. The arrangement of many pins on the skewer facilitates manipulation by the cook. Also, the combination of the pins and skewer members holds the food securely on the pins regardless of shrinkage during cooking or the fragility of the type of food being cooked. In a preferred embodiment of the invention, the pins have two prongs and so hold the food even more securely.

In a method according to the present invention, the food is pierced with the pin, and the pin is supported by the two skewer members between the retainers, and the skewer members are mounted on the raisers over a source of heat. This leads to the advantages discussed above.

These and other objects and advantages of the present invention will become apparent from the following description of the preferred embodiments when taken in conjunction with the accompanying drawings.

DETAILED DESCRIPTION OF THE PREFERRED EMBODIMENTS

Figure 1:
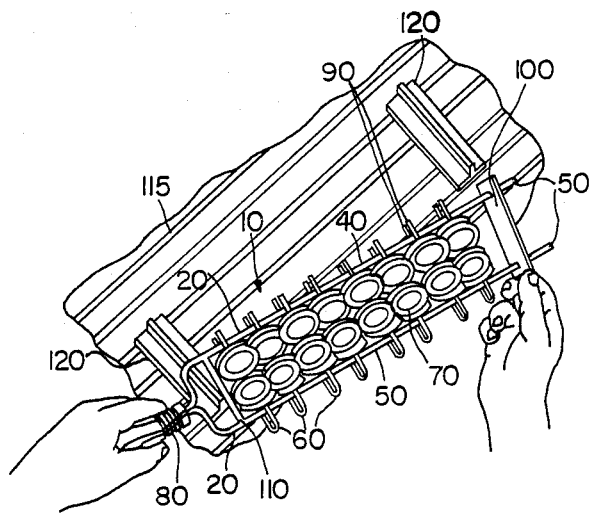
FIG. 1 is a top perspective view of a preferred embodiment of a cooking apparatus according to the present invention.

FIG. 1 shows a skewer 10 having two skewer members 20. Skewer members 20 are preferably metal. They are joined at one end and then diverge into straight sections 40. The skewer members 20 terminate in free ends 50. In a preferred embodiment of the invention, the straight sections 40 are substantially parallel and coplanar to, in effect, form rails on which pins 60 may be supported.

Figure 2:
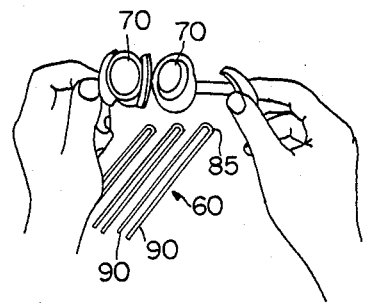
FIG. 2 is a side perspective view illustrating arranging pieces of food arranged on a pin in a manner according to the present invention.
Figure 3:
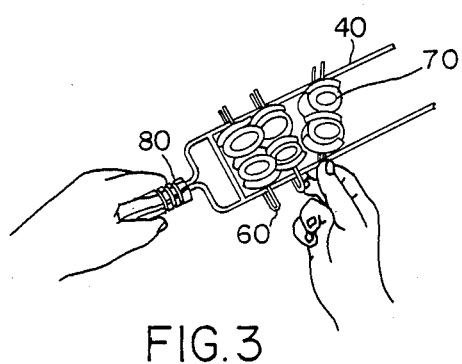
FIG. 3 is a side perspective view illustrating the supporting of a pin on a skewer adjacent a retainer member in a manner according to the present invention.

Pins 60 are visible in FIGS. 1, 2, and 3. In a preferred embodiment, each is formed of a piece of metal shaped to form a bend 85 having two piercing prongs 90. Piercing prongs 90 pierce food 70, which is then slid down the prongs toward the bend 85 as illustrated in FIG. 2.

The skewer shown in Figure also preferably includes a handle 80 connected to the joined ends of skewer members 20. The handle is preferably made out of an insulating material, such as wood.

The pins 70 are arranged on the skewer members 20, and specifically, the straight sections thereof, in a manner which will be described more fully below.

The present invention also preferably includes a first retaining element 100 for preventing the pins 70 from prematurely or inadvertently sliding off of the free ends 50 of the skewer members 20. Retaining element 100 defines the distal end of a pin supporting area 105 on skewer members 20. In a preferred embodiment, the first retaining element takes the form of a metal bar, plate, spring element, wire clip, or like element having two holes, apertures, or suitable mounting portions spaced apart by a distance corresponding to the distance between skewer members 20 and adapted to be removably secured thereon.

The skewer also preferably includes a second retaining element 110 defining the proximal end of the pin supporting area 105 and further maintaining the skewer members 20 spaced away from one another at a fixed distance. In a preferred embodiment of the present invention, this member may be similar in construction to that of retaining element 100 and adapted to be fixed or removably secured on skewer members 20 transverse to the straight sections 40 and joining the straight sections 40 at a location near where the skewer members 20 start to converge. The retaining elements 100 and 110 serve to define the placement position or cooking area 105 of pins 60, bearing pieces of food 70, on the skewer members 20.

Figure 4:
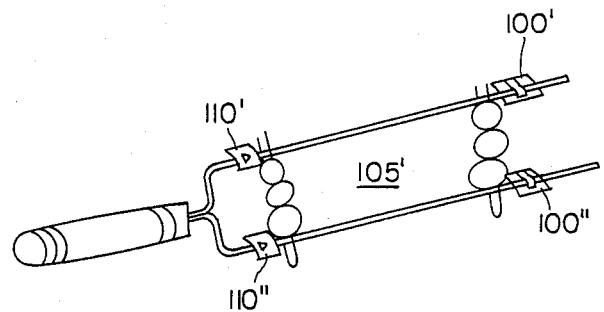
FIG. 4 is a top perspective view of a second embodiment of retainer members disposed on a skewer in accordance with the present invention.

In a second embodiment of the present invention, as shown in FIG. 4, either or both of retaining elements 100 and 110 may take the form of discrete locating collars 100', 100" and 110', 110". The collars may be constructed as spring clips, collars, clamps, or the like adapted to be fixed or removably disposed at spaced locations along skewer members 20 to define pin supporting or cooking area 105'. In use, the cook pierces the pieces of food with piercing prongs 90 to arrange a desired amount of food on pin 60. It is desirable to leave a small opening at each end of the pin 60 for receiving the skewer members 20.

After the food is arranged on pins 60 the cook slides them onto the skewer 10, usually leaving a small space between each pin 60 for even cooking. Each pin 60 is slid onto skewer 10 by inserting one free end 50 of one of the skewer members 20 between the bend 85 and the piece of food nearest the bend, and the free end 50 of the other skewer member 20 between the free ends of piercing prongs 90 and the piece of food nearest the free ends of piercing prongs 90.

After the cook places a desired number of pins 60 on skewer members 20, he or she places retaining element 100 between the free ends 50 of skewer members 20 and the pin 60 closest to free ends 50.

The skewer 10 preferably is supported above a grill surface 115 (shown partially broken away) or other source of heat by raiser elements 120 disposed between the grill and the skewer 10. The raiser elements may also be placed directly onto hot coals or any other desired cooking heat source or fire. In a preferred embodiment, raiser elements 120 are a pair of inverted T-shaped members, the top of each T serving as the base surface against the grill, and the end of the leg of the T serving as a support stand for the skewer. Preferably the raisers are positioned on the grill cooking surface, one at either end of the skewer generally as shown in FIG. 1.

Figure 5:
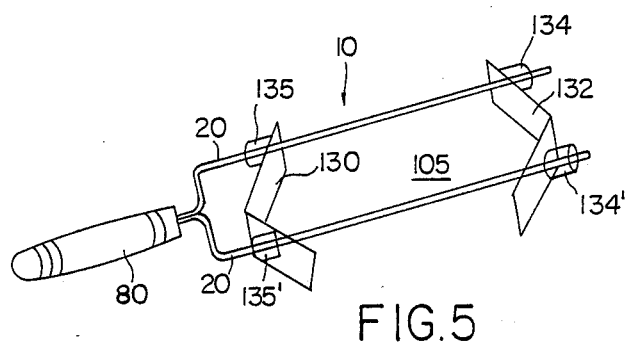
FIG. 5 is a top perspective view of a third embodiment of shield members disposed on a skewer in accordance with the present invention.

In a third embodiment of the present invention, as shown in FIG. 5, the skewer 10 is provided with a pair of shields 130 and 132 disposed at the distal and proximal ends of the cooking area 105. The shields may take the form of a V-shaped barrier secured to the skewer 10 by friction or by suitable fastening members 134, 134', 135, and 135, The fastening members 134, 134', 135, and 135, may take the form of spring clips, clamps, or the like adapted to be fixed or removably disposed at spaced locations along the skewer 10. The shields 130 and 132 serve as both retaining elements for preventing the pins 70 from sliding off the free ends 50 of the skewer members 20 and also as raiser elements for supporting the skewers above the heat source. Accordingly, retaining elements 100 and 110 and raiser elements 120 are omitted in this embodiment. The V-shape is selected in order to ensure that the shields do not slide through the grates of a cooking grill; it is possible, however, to employ another configuration, such as a zig-zag or arcuate shaped shield which likewise prevents itself from slipping through the grates of a cooking grill. Preferably, the shields are comprised of metal or other suitable material which is able to withstand conventional cooking temperatures.

During cooking, the cook can easily turn all the food simply by turning the handle 85 of skewer 10. Because the axis of rotation of the pin and food is transverse to the longitudinal axis of the pin, there is absolutely no problem of the food not turning with the pin when the skewer is rotated. Also, with a pin according to the type which has been described, the food is securely held at two points rather than just one. Moreover, the arrangement according to the present invention retains the advantage of conventional metal skewers in that the pin conducts heat to the center of the food so that the food is cooked both from the outside and the inside, promoting more even cooking.

An apparatus and a method according to the present invention also permit a facilitated presentation and eating of the food. When the food is done, the cook need only transfer the pins to an individual plate or platter. Because the pins 60 are relatively small, their heat capacity is small as well, so that very soon, and before the food cools off, the pins will be cool enough to handle. The diner may use the pin as a holder, a utensil, and may eat the food right from the pin without having to use an additional utensil much like an hors d'oeuvre.

An apparatus and a method according to the present invention make it possible to perform many of the more labor intensive operations associated with barbecue cooking prior to the cooking itself in manner never before possible. It also reduces the amount of time spent cooking and cleaning up. Each pin can hold a separate course or portion, with many different courses or portions being prepared in advance, before guests arrive.

The increased flexibility in scheduling pre-cooking preparation of the food, as well as the ability to cook more food at one time with a minimum amount of attention, eliminates the need to prepare and carefully watch food for an extended period of time when socializing would be preferred.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. Cooking apparatus comprising:
   (a) a skewer having at least two skewer members joined at one end, each of the skewer members having a substantially straight section terminating in a free end; and
   (b) a plurality of pins, each comprising two parallel piercing prongs connected by a bend, movably supported by the straight section of the skewer members, for suspending pieces of food between the skewer members;
   (c) means cooperating with said skewer members for retaining aid plurality of pins thereon; and
   (d) means interposed between the skewer members and a cooking surface for supporting said skewer members spaced from and in superposition with the cooking surface.

2. Apparatus as claimed in claim 1 wherein the skewer further includes a handle connected to the skewer members where the skewer members are joined.

3. Apparatus as claimed in claim 1 wherein the straight sections of the skewer members are substantially coplanar and parallel.

4. Apparatus as claimed in claim 1, wherein said supporting means are inverted T-shaped raiser elements.

5. Apparatus as claimed in claim 1 where each pin is movably supported on the skewer by inserting one of the skewer members through the prongs between the bend and the piece of food nearest the bend, and by inserting another of the skewer members through the prongs between the free ends of the pin and the piece of food nearest the free ends of the pin.

6. Apparatus as claimed in claim 1 further comprising reinforcing means for maintaining a fixed spacing between the skewer members.

7. Apparatus as claimed in claim 1 wherein said retaining means and said supporting means are incorporated as part of shield means for preventing the pins from sliding off the skewer members and for supporting said skewer members away from a heat source.

8. Apparatus as claimed in claim 7 wherein said shield means comprises:
   (a) a V-shaped barrier member; and
   (b) means for removably securing said V-shaped barrier to the skewer.

9. A method of cooking pieces of food comprising the steps of:
   (a) piercing the pieces of food with a pin;
   (b) movably supporting said pin on at least two skewer members and retaining said pin thereon where said pin is not affixed to the skewer members; and
   (c) positioning the skewer members spaced from and in superposition with a cooking surface.

10. A method as claimed in claim 11 wherein the pin has two piercing prongs, wherein step (a) comprises piercing the food pieces with both prongs, and wherein step (b) comprises sliding the skewer members between the prongs.

11. A method of cooking pieces of food, comprising the steps of:
    (a) piercing the pieces of food with a pin having at least two piercing prongs;
    (b) movably supporting the pin on a skewer having at least two skewer members by orienting the prongs transverse to the skewer members and sliding the skewer members between the prongs;
    (c) retaining the pin on the skewer members; and
    (d) positioning the skewer members in spaced superposition with a source of heat.

12. A method of cooking, serving, and eating pieces of food comprising the steps of:
    (a) piercing the pieces of food with a pin having at least two piercing prongs;
    (b) movably supporting the pin on a skewer having at least two skewer members by orienting the prongs transverse to the skewer members and sliding the skewer members between the prongs;
    (c) retaining the pin on the skewer members;
    (d) positioning the skewer members spaced from and in superposition with a cooking surface;
    (e) removing the skewer members from the cooking surface when a desired degree of doneness is achieved;
    (f) removing the pins from the skewer members;
    (g) serving the pieces of food still on the pin and;
    (h) eating the pieces of food using the pin as a utensil to hold and bring the food to the mouth.

* * * * *

UNITED STATES PATENT AND TRADEMARK OFFICE
CERTIFICATE OF CORRECTION

PATENT NO. : 4,839,186

DATED : June 13, 1989

INVENTOR(S) : Peter J. Boyle

It is certified that error appears in the above-identified patent and that said Letters Patent is hereby corrected as shown below:

Claim 1, line 25, "aid plurality" should be -- said plurality".

Signed and Sealed this

Sixth Day of February, 1990

Attest:

JEFFREY M. SAMUELS

Attesting Officer     Acting Commissioner of Patents and Trademarks